(12) United States Patent
Ito (10) Patent No.: US 6,346,910 B1
(45) Date of Patent: Feb. 12, 2002

(54) AUTOMATIC ARRAY CALIBRATION SCHEME FOR WIRELESS POINT-TO-MULTIPOINT COMMUNICATION NETWORKS

(75) Inventor: Tei Ito, 10115 Round Top Ct., Fairfax, VA (US) 22032

(73) Assignee: Tei Ito, Fairfax, VA (US)

( * ) Notice: Subject to any disclaimer, the term of this patent is extended or adjusted under 35 U.S.C. 154(b) by 0 days.

(21) Appl. No.: 09/545,874

(22) Filed: Apr. 7, 2000

Related U.S. Application Data (60) Provisional application No. 60/128,076, filed on Apr. 7, 1999.

(51) Int. Cl.[7] ................................................. G01S 7/40
(52) U.S. Cl. ....................................................... 342/174
(58) Field of Search .......................................... 342/174

(56) References Cited

U.S. PATENT DOCUMENTS

| | | | |
|---|---|---|---|
| 5,828,658 A | 10/1998 | Ottersten et al. ........... 370/310 |
| 5,936,569 A | 8/1999 | Ståhle et al. ................. 342/174 |
| 6,021,334 A | 2/2000 | Aste et al. ................... 455/562 |
| 6,037,898 A | 3/2000 | Parish et al. ................. 342/174 |
| 6,157,343 A | * 12/2000 | Andersson et al. ......... 342/174 |
| 6,266,528 B1 | * 7/2001 | Farzaneh ..................... 455/423 |

* cited by examiner

*Primary Examiner*—Theodore M. Blum (57) ABSTRACT

An automatic array calibration apparatus which is capable of periodically calibrating beamforming offsets using internally generated calibration and test signals. The apparatus preferably includes a calibration signal generating unit which generates a continuous wave calibration signal which is input into a receiving channel as the input signal. I/Q signals are obtained from reception data channels which have been provided with the calibration signal. The apparatus also includes a loop back operation in which test signals are injected in transmission data channels, and are prepared for transmission at a transmission unit. The transmission signal is looped back to the receiving unit and I/Q signals are obtained from reception data channels supplied with the transmission signals.

17 Claims, 7 Drawing Sheets

AUTOMATIC ARRAY CALIBRATION SCHEME FOR WIRELESS POINT-TO-MULTIPOINT COMMUNICATION NETWORKS

The invention claims priority to U.S. provisional patent application 60/128,076, filed Apr. 7, 1999 under 35 U.S.C. 119, herein incorporated by reference.

FIELD OF THE INVENTION

The invention relates to a system and method for automatically calibrating beamforming coefficients for wireless communication networks. More particularly, the invention relates to a system and method for automatically calibrating beamforming coefficients for wireless communication networks that employ a multiple number of antennas and RF units to perform spatial diversity.

BACKGROUND OF THE INVENTION

Point-to-multi point communication networks typically consist of a central base station (hub) and several remote users, located at different locations. The hub typically contains an antenna array. Antenna arrays have been used to increase the information capacity sent to remote users. A typical antenna array is capable of forming a beam towards each desired user and placing nulls in the direction of interferers, thus minimizing the total energy required for acceptable link performance.

Each antenna on the antenna array typically has a corresponding receive channel which includes a corresponding receiver and a corresponding channel unit. The typical RF receiver obtains the desired signal by filtering out the unwanted portions of the received broadcast signal. Each RF receiver provides the desired frequency signal to a corresponding channel unit, where the desired frequency signal is digitized in an A/D converter, demodulated in a demodulator and decoded in a decoder. The output of the plurality of channel units are then operated on by a beamforming vector and combined into one signal.

The beamforming operation is typically accomplished by applying an adaptive algorithm to the output of each channel. Under ideal conditions the output of the each of the receive channels produce the same amplitude and quadrature of a receive signal as the other channels, when the signal arrives simultaneously at all antennas, thus the receive channels are said to be balanced. However, due to variations in the respective signal paths between the antennas of the antenna array and the respective corresponding circuitry in the channels, which may be caused by a variety of factors such as manufacturing variances, the channels are not likely to be balanced, and thus the output of the receive channel units may be different in amplitude, phase and quadrature. Accordingly, the beamforming operation should also account for an imperfectly balanced set of receive channels. More particularly, the beamforming operation typically is performed by a predetermined beamforming vector which includes offsets to balance the amplitude, phase and quadrature between the respective channels.

Also in the typical prior art system, the hub is capable of simultaneously broadcasting to a plurality of remote users with a plurality of channels, which is known as downlink. A transmission channel is similar to the receive channel, except in the direction of the signal flow. Thus a transmission channel typically includes a transmission channel unit, a transceiver and an associated antenna. The transmission channel unit typically contains an encoder which encodes the signal, a modulator which modulates the signal and a D/A converter which converts the signal to analog. A beamforming operation is performed to generate a signal into a plurality of signals, each of which is carried and broadcasted by an individual transmission channel. The transmission beamforming operation is similar to the reception beamforming operation, and thus it also accounts for unbalanced transmission channels.

Nulls are also typically formed by the antenna array to minimize interference to the intended remote users. However, unmatched channels can destroy otherwise correctly formed beams and nulls. Unmatched channels may be caused by the inability of the beamforming vector to include the channel in the beamforming operation due to not having the offsets necessary to balance the channel with the other channels. A solution to this problem is to calibrate the transmitting antenna array by radiating test signals to different directions. However, this is a very time-consuming and expensive process. Another solution is to impose a very tight specification for amplitude and phase matching among channels. However, this is also an expensive design solution.

SUMMARY OF THE INVENTION

It is an object of the invention to develop an inexpensive, cost effective automatic array calibration scheme which solves the foregoing problems.

It is another object of the invention to develop an automatic array calibration scheme which adjusts to varying transceiver conditions.

It is another object of the invention to develop an automatic array calibration scheme which contains the processing operations of the calibration scheme in an indoor unit of the antenna array system.

To achieve the foregoing and other objects and in accordance with the purpose of the present invention, as embodied and broadly described herein, one embodiment of the present invention comprises: a calibration signal generating unit which generates a calibration signal; a calibration signal injecting unit which is operable to selectively inject the calibration signal as an input signal; a receiver unit which receives the input signal and obtains a channel signal from the input signal; a reception data channel unit which receives the channel signal and generates a first set of I/Q signals; and a controller which controls the calibration signal injecting unit to selectively insert the calibration signal as the input signal, and receives the first set of I/Q signals from the reception data channel unit, wherein the controller calculates a reception data channel offset based on the first set of I/Q signals.

In accordance with the objects and purposes of the present invention, in one embodiment the antenna array calibration apparatus further comprises: a transmission data channel unit which includes a transmission data channel being provided with a test signal; a transmission unit which generates a transmission signal based on the transmission data channel; a loop back unit which selectively provides the transmission signal as the input signal, wherein the controller controls the loop back unit to selectively provide the transmission signal as the input signal, the reception data channel unit generates a second set of I/Q signals based on the transmission signal provided as the input signal, and provides the second set of I/Q signals to the controller, and the controller calculates a loop back offset based on the second set of I/Q signals.

In another aspect of the invention, the controller calculates a transmission channel offset according to the equation:

$C_{tx} = C_{loop}/C_{rx}$, where: $C_{tx}$ represents the transmission data channel offset, $C_{loop}$ represent the loop back offset, and $C_{rx}$ represents the reception data channel offset.

In yet another aspect of the invention, the controller calculates a modification vector according to the equation: $\underline{W}_{mod} = \text{conj}(C_{loop})/\text{abs}(C_{tx})^2$ where: $\underline{W}_{mod}$ represents the modification vector.

In still another aspect of the invention, the controller calculates a transmission beamforming vector according to the equation: $\underline{W}_{tx} = \underline{W}_{mod} * \underline{W}_{rx}$ Where: $\underline{W}_{tx}$ represents the transmission beamforming vector, and $\underline{W}_{rx}$ represents a reception beamforming vector.

In yet another aspect of the invention, the transmission unit comprises a plurality of transmission data channels, and each channel of the plurality of transmission data channels is simultaneously selectively injected with a test signal when the loop back unit selectively provides the transmission signal as the input signal.

The present invention also relates to a method for obtaining calibration parameters, in one embodiment, the method comprises the steps of: generating a calibration signal as an input signal; selectively injecting the input signal into receive channels; obtaining a first set of I/Q signals; and calculating a reception data channel offset based on the first set of I/Q signals.

The novel method may further comprise the steps of providing a test signal in a transmission data channel; generating a transmission signal from the transmission data channel; selectively providing the transmission signal as the input signal when the calibration signal is not provided as the input signal; generating a second set of I/Q signals, the second set of I/Q signals based on the transmission signal provided as the input signal; and calculating a loop back offset based on the second set of I/Q signals.

The present invention has several advantages over the prior art. These advantages include, but are not limited to: being able to adaptively calculate the transmission beamforming vector by using the receive beamforming vector; calculating the beamforming vector by using internally generated calibration signals, thus eliminating the need to rely on external devices; adaptively calculating offsets without interfering with the operation of the antenna array; inexpensively achieving an offset calibration and transmission beamforming calculation process; and achieving an offset calibration and transmission beamforming calculation process in an indoor unit, thus reducing the cost and increasing durability of the system.

Additional advantages of the present invention will become apparent to those skilled in the art from the following detailed description of exemplary embodiments of the present invention. The invention itself, together with further objects and advantages, can better be understood by reference to the following detailed description and the accompanying drawings.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

In the various figures, identical or similar elements, structures and operations are similarly numbered. Any differences between similarly numbered elements, structures and operation in the various figures will be apparent to the artisan from the figures or from the following description.

DETAILED DESCRIPTION OF THE INVENTION

Reference will now be made in detail to the presently preferred embodiments of the invention, examples of which are illustrated in the accompanying drawings.

Figure 1:
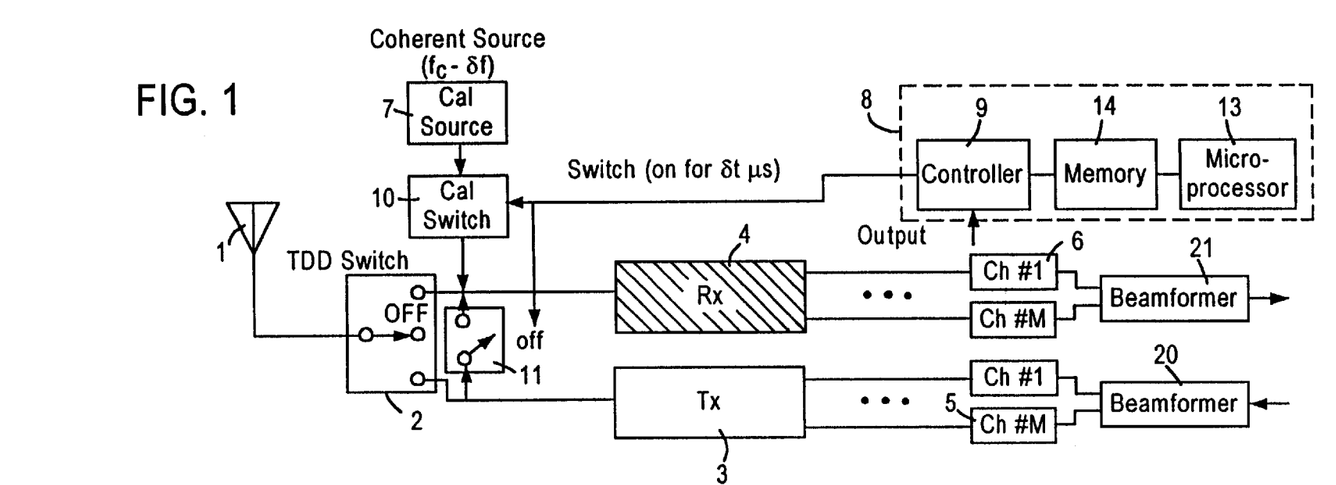
FIG. 1 illustrates an exemplary schematic of an antenna array system of the present invention in a receive channel calibration mode.
Figure 2:
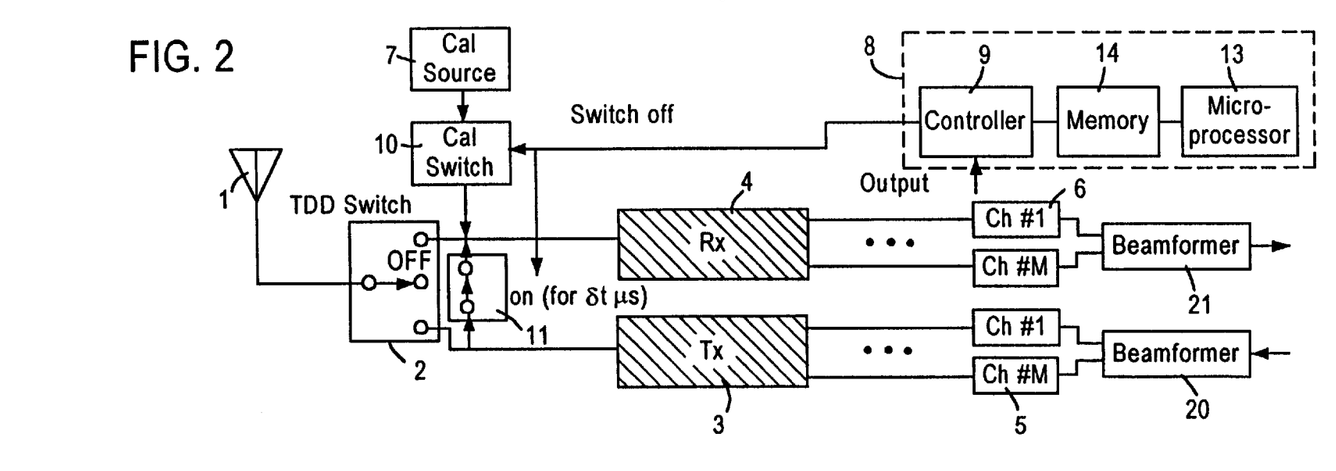
FIG. 2 illustrates an exemplary schematic of an antenna array system of the present invention in a loop back calibration mode.

FIGS. 1 and 2 illustrate a schematic of an exemplary automatic calibration apparatus according to the present invention. FIG. 1 is a schematic illustrating the present invention in a receive channel calibration mode, and FIG. 2 is a schematic illustrating the present invention in a loop back mode.

Figure 3:
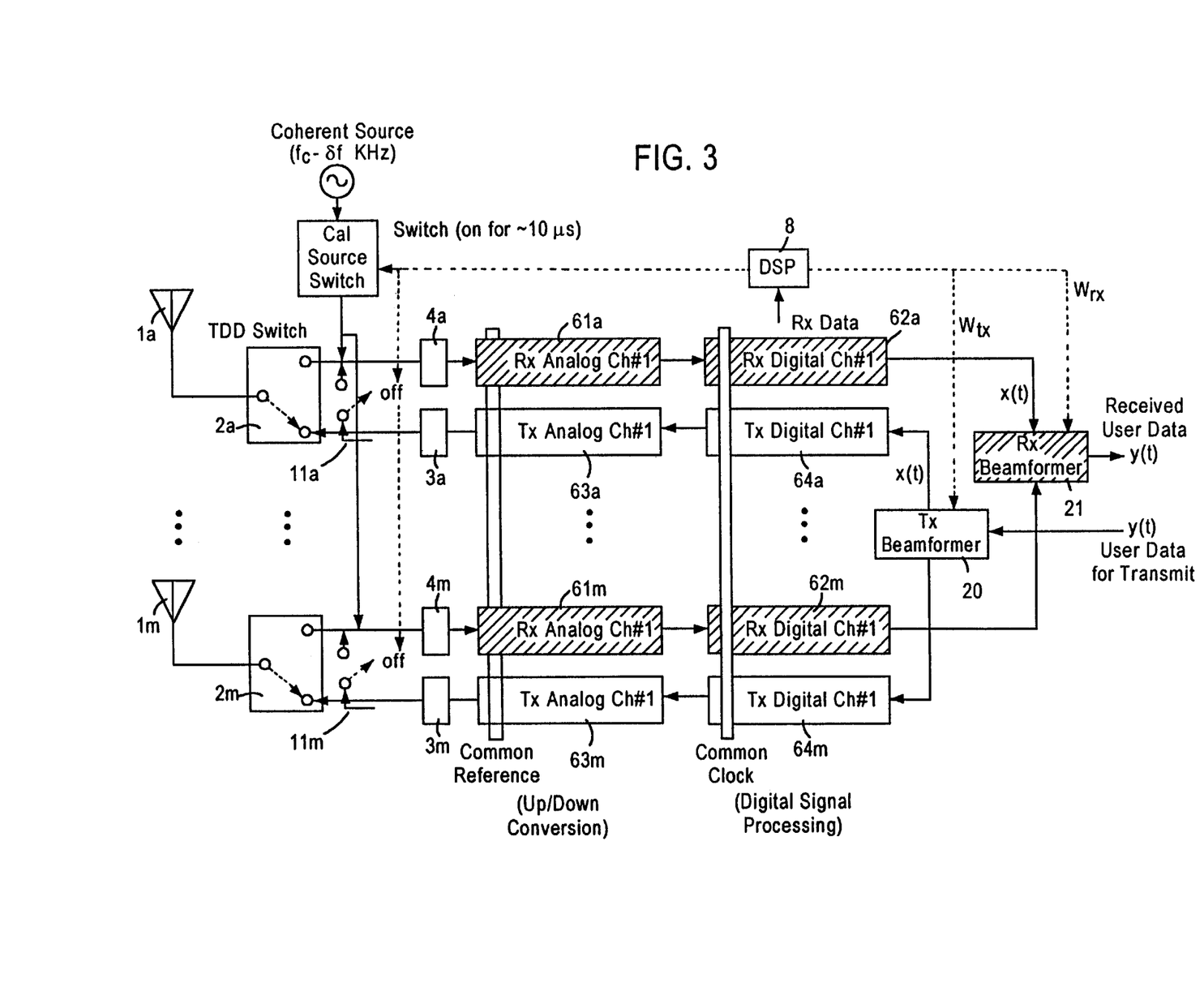
FIG. 3 illustrates an exemplary schematic of receive and transmission channel units.

In FIG. 1, an antenna array 1 transmits and receives signals to a plurality of remote users. The antenna array 1 is of a structure commonly known to those of skill in the art and contains a plurality of antennas. Each antenna can be individually operated. The antenna array 1 according to the present embodiment contains, for example, eight antennas. Each antenna of the plurality of antennas is connected to, and part of, a corresponding receive channel and a corresponding transmission channel through a transmit/receive (T/R) switch 2. The T/R switch may be a plurality of commonly controlled T/R switches 2a–m as shown in FIG. 3. Referring to FIG. 3, each receive channel includes an antenna 1a–m, which is disposed in the antenna array 1, an RF receiver 4a–m, and a channel unit 6a–m (FIG. 3).

In one embodiment, the T/R switch 2 is either a time division duplexing (TDD) switch or a frequency division duplexing (FDD) diplexer, both of which are commonly known and used in the art. The T/R switch 2 in the present embodiment is a TDD switch. An example of a TDD switch that can be utilizes is model AW002 R-12 manufactured by Alpha Industries, Inc. As known, a TDD scheme receives a signal in a certain time period, and transmits in another time period.

The T/R switch 2 in the present embodiment provides received signals to a receiving unit 4. The receiving unit 4 comprises a plurality of receiving units 4a–m, one receiving unit corresponding to one antenna 1a–m of the antenna array 1. Each receiving unit 4a–m of the plurality of receiving units of the present embodiment includes a bandpass filtering device (not shown) that filters through (passes) the desired portions of the received signal, for example, a 20 MHz bandwidth around a 2.4 GHz center frequency. Each receiving unit 4a–m also has a down-converter (not shown) that shifts the obtained RF frequency band to a lower frequency IF (intermediate frequency) by a process known as down conversion to avoid attenuation loss in the transmission cables between the receiving unit 4 and the reception channel unit 6. Since receiving unit 4 is contained on a tower holding the antenna array, the cable length between the receiving unit 4 and the reception channel unit 6 may be fairly long. Thus, unless the RF to IF conversion is performed, the attenuation of the received signal may be significant. Preferably, the RF frequency is translated into the IF frequency in a coherent manner by using a common oscillator for all of the receiving units. Accordingly, the 2.4 GHz center frequency may be shifted to a center frequency of 90 MHz, while maintaining the 20 MHz bandwidth.

The receive unit 4 provides the down-converted signal to the reception data channel unit 6, which is composed of a plurality of reception channel units 6a–m, each corresponding to an individual receive unit 4a–m and an individual antenna 1a–m. Thus, for example if there are eight antennas in the antenna array, there will be eight analog receive units and eight digital reception data channel units. The structure and general operation of the reception data channel units 6a–m, which is illustrated in FIG. 3.

Referring to FIG. 3, each reception data channel unit 6a–m contains an analog channel portion 61a–m and a digital reception channel portion 62a–m. As commonly known in the art, the analog channel portions 61a–m shift the received IF frequency to a D.C., while maintaining the 20 MHz bandwidth. Then the shifted frequency is provided to the digital reception channel portions 62a–m where it is digitized in an A/D converter (not shown) contained within the digital reception channel portion. Next, the digitized signal is demodulated in a demodulator (not shown) and then decoded by a decoder (not shown), both of which are contained in the digital reception channel portions 62a–m.

A match filter unit (not shown) is also provided in the digital reception channel portion which pulls a unique ID signal out of a preamble portion of a received signal. The match filter unit continuously searches for a predetermined number of known unique ID signals in order to identify if a signal from a particular remote user is being received. As new remote users are added to the system, which uses the hub antenna array system, the unique ID of the new remote user may be added to the match filter unit so that the unique signal of the new remote user may be identified when the new emote user broadcasts a signal to the antenna array.

The unique ID signal is then provided to a controller 9 which uses the unique signal to generate a unique weight forming vector, which is used to obtain the signal from an individual remote user. The weight forming vector also contains offsets which are necessary to balance the receive channels i.e. balance the amplitude and quadrature of the receive channels.

Particularly, as known in the art, the antenna array may be simultaneously receiving a plurality of signals from a plurality of remote users, with all of the signals being transmitted at the same frequency. Therefore, in order to obtain the data contained in a signal generated by a remote user/location, the individual remote signal must be separated from the other remote signals. This separation is achieved by the beamforming operation which exploits temporal differences between the channels of the array and between the individual remote signals.

More particularly, each remote signal is received at the individual antenna elements on the antenna array at different times depending on the relative incident angle which the broadcast signal hits the antenna array, i.e it will be received at the closest antenna element at an earlier time than the furthest antenna element. Therefore, the particular signal may be separated from the other plurality of signals received by exploiting the phase and amplitude differences introduced in the signal by the temporal differences from the incident angle of the signals on the antenna array. As known by those of skill in the art, by balancing the respective receive channels so that the amplitude and quadrature are the same, the temporal difference in the remote broadcast signal can be identified by phase and amplitude variations between the respective receive channels caused by the incident angle of the remote signal on the antenna array. In this manner, using a properly formed weight vector, i.e. obtaining the correct offset to balance the channels, on each of the outputs of the digital reception channel portions 62a–m enables the signal from an individual remote user to be identified.

More significantly, the combination of the output signals of each of the digital reception channel portions after the beamforming vector is applied to each respective output results in forming the remote signal by eliminating all other remote signals. It will be appreciated by those of skill in the art, that a different beamforming vector will be necessary to obtain each remote signal. Furthermore, the different beamforming vectors may be simultaneously applied as the different remote users simultaneously broadcast to the antenna array.

The outputs of the digital reception channel portions 62a–m are provided to a beamformer 21, where a beamforming operation occurs on the output of each digital reception channel portion 62a–m individually and simultaneously, as known in the art. The beamformed signals from each digital reception channel portion are then combined together into one signal.

The calculation of beamforming weights applies an adaptive algorithm to the received input signal. The adaptive algorithm uses the unique signature contained in the input signal of each individual remote user. Particularly, a beamforming vector $\underline{W}_{rx}$ is computed adaptively from the unique signature of each user and then used to obtain the data channels in the beamforming operation. The weight forming vector also contains the offsets necessary to balance the channels. The beamforming process multiplies the transpose conjugate of the weight forming vector with the signal vector, which is composed of all of the received signals at a present time, in order to obtain the respective remote signal. Thus, with a proper weight forming vector, i.e. the proper offsets in the weight forming vector, the final output of the beamforming process represents mainly the signal arriving from the direction of interest. Equation 1 illustrates the receive channel beam forming operation.

$$y(t) = \underline{W}_{rx}^{H} \underline{x}(t) \qquad \text{Eq.1}$$

where y(t) is the scalar output of the beamforming process, which singles out the signal coming from one direction; $\underline{x}(t)$ is the received signal column vector from channels 1 through m; and $\underline{W}_{rx}$ is the receive beamforming column vector, with $\underline{W}_{rx}^{H}$ indicating the transpose conjugate, which was computed by an adaptive least-squares technique.

The transmission channels operate in a similar manner as the receive channels, except the signal flow is in the opposite direction. Referring to FIGS. 1 through 3, user data for transmission is provided to a transmission beamformer 20 where it is operated on by a transmission beamforming vector. The transmission beamforming vector is similar to the receive channel vector. The beamforming process splits the transmission signal into the different antenna elements with a proper weight forming vector to direct the signal to the direction of interest when it radiates from the antenna array. The transmission beamforming vector is given by equation 2.

$$\underline{x}(t) = \underline{W} y(t) \qquad \text{Eq.2}$$

where $\underline{W}_{tx}$ is the transmit beamforming column vector, which has been adjusted by the calibration technique of the current invention; y(t) is the scalar signal to be transmitted; and $\underline{x}(t)$ is the vector signal to be transmitted. All of the quantities are in the complex domain.

The transmission beamforming unit 21 provides the beamformed signal to digital transmission channel portions 64a–m where it is encoded in an encoder (not shown) and modulated in a modulator (not shown), both of which are contained in the digital transmission channel portions 64a–m. The modulated and encoded signal is converted into an analog signal in an D/A converter (not shown) also contained in the digital transmission channel portions 64a–m. The analog signal is provided to analog transmission channel portions 63a–m. The analog transmission channel portions 63a–m convert the center frequency to an IF frequency. Then the transmission signal is provided to the transceiver unit 3 comprising transceiver units 3a–m. Each transceiver unit 3a–m includes an up-converter that translates the carrier frequency of the transmit channel from an intermediate frequency (IF) to an RF frequency, such as 2.5 GHz, in a coherent manner by sharing a common reference oscillator. The transceiver then provides the RF frequency signal to the antenna array 1 through the T/R switch 2.

The number of transmission data channels is preferably equal to the number of reception data channels. The user data may be provided to or received from communication devices, such as a modem or telephone devices.

As shown in FIG. 1, calibration data generated by a calibration data generating unit 7 is set at a frequency of $f_c - \delta f$ to obtain a continuous wave calibration signal (CW), which may be in the form of a sine wave. The frequency $f_c - \delta f$ is produced by a coherent source among the receiving channels, where $f_c$ is the center frequency of the antenna array system and $\delta f$ is an offset frequency which creates a phase variation in the baseband. In the preferred embodiment, the $\delta f$ is preferably about 5–10 KHz. The purpose of this offset frequency is to provide a non-zero frequency component when the injected signal reaches the baseband after a series of down-conversions, which characterizes the amplitude and phase response of the channels. The choice of the f value is dictated by the sampling frequency of the analog-o-digital converters used and the duration of the signal injection so that the received samples cover a few full cycles of the calibration frequency, such as a sinusoid, with sufficient resolution. In the present embodiment, the calibration frequency is applied for about 10 μs.

During a receive channel calibration operation, a controller 9 controls a switch 10 to inject the CW signal into the receive channel from the antenna array 1 when a loop back switch 11 is in the OFF position. The loop back switch 11 may be a plurality of commonly controlled loop back switches 11a–m as shown in FIG. 3. The controller 9 receives digitized signals indicating in phase and quadrature phase (I/Q signals) of each of the channels of the processed input signals from reception data digital reception channel units 62a–m during the receive channel calibration operation. It is well-known in the art of communications engineering that a real RF or IF signal may be constructed by combining two phase-locked carriers, that are amplitude modulated at a fixed phase angle (90 degrees from each other). They are called in-phase (I) and quadrature (Q) components of the modulated signal, which carries two independent sets of information in the same frequency bandwidth. The T/R switch 2 is in an OFF position for the receive channel operation as shown in FIG. 1, although those of skill in the art will appreciate that the particular position of the T/R switch 2 is of no consequence so long as the CW data is injected in the receiving unit 4.

The controller 9 provides the I/Q signals obtained during the receive channel offset calculation and during the loop back operation to a memory 14 where each of the I/Q signals are stored. The I/Q signals are then provided to a microprocessor 13 which, as detailed below, calculates a receive channel offsets $C_{rx}$, loopback offsets $C_{loop}$, transmission channel offsets $C_{tx}$, modification vectors, receive channel beamforming vectors, and transmission channel beamforming vectors. The receive channel offsets $C_{rx}$, the loopback offsets $C_{loop}$, and the transmission channel offsets $C_{tx}$ are all in the form of vectors. The controller 9, memory 14 and the microprocessor 13 are contained in a programmable digital signal processor (DSP) 8. An operator input device (not shown) is also connected to the DSP 8 so that an operator can input a command to initiate a calibration operation.

As shown in FIG. 2, during a transmission channel calibration operation, the controller 9 controls the loop back switch 11 to provide the transmission signal from the transmission unit 3 as the input signal by placing the loop back switch 11 in the ON position. The controller injects a test signal into the transmission beamformer 20 as the user data. The test is operated on by beamformer 20 in the normal manner as the user data as described above, and provided to the transmission channels. The test signal is digital data at a digital Tx I/Q level and may be injected into each of the channels of the transmission data channel unit 5 simultaneously. The test signal has no meaning in the content, i.e. the test signal is preferably a preset test pattern that covers all possible digital symbols of chosen modulation. The transmission channels, containing the test signal, are prepared for transmission in the transmission unit 3 and then provided to the receiving unit 4 via the loop back switch 11. The receiving unit 4 processes the looped back transmission signal as a typical received input signal and provides the processed looped back transmission signal to the reception data channel units 6. Next, the controller 9 receives digitized I/Q signals from reception data channel unit 6. The T/R switch 2 is in an OFF position for the transmission channel offset calibration operation as shown in FIG. 2, although those of skill in the art will appreciate that the particular position of the T/R switch is of no consequence so long as the transmission signal with the test data is injected in the receiving unit 4.

The antenna array 1, the T/R switch 2, the transmission unit 3, and the receiving unit 4 may be referred to as the outdoor unit. The transmission data channel unit 5, the reception data channel unit 6 and the controller 9 may be referred to as the indoor unit. The control of the calibration process is performed in the DSP 8 and thus is contained in the indoor unit. Accordingly, the calibration process may be inexpensively implemented by software on the DSP 8 and may be less susceptible to environmental conditions.

The DSP 8 uses the received I/Q signals during each of the receive channel calibration and the transmission channel calibration operations to calculate receive channel offsets $C_{rx}$, transmission channel offsets $C_{tx}$, such as the phase and amplitude, both of which are contained in one complex number. The DSP 8 ultimately calculates the transmission channel beamforming vectors $\underline{W}_{tx}$ based on receive channel beamforming vectors $\underline{W}_{rx}$, which are computed adaptively during the operation of the system. More particularly, the DSP 8 determines the differences in amplitude and phase of the I/Q signals between the channels in the reception data channel unit 6 and also between the injected CW signal and the received I/Q signal in the receive channel calibration operation. Likewise, the DSP 8 determines the differences in amplitude and phase of the I/Q signals between the channels in the reception data channel unit 6 and also between the injected test signal and the received I/Q signal in the transmission channel calibration operation. The flow charts in FIGS. 3–6 illustrate the operation of the present invention. The calibration process of the present invention is performed after initialization of the antenna array system, or as part of the initialization of the antenna array system.

Figure 4:
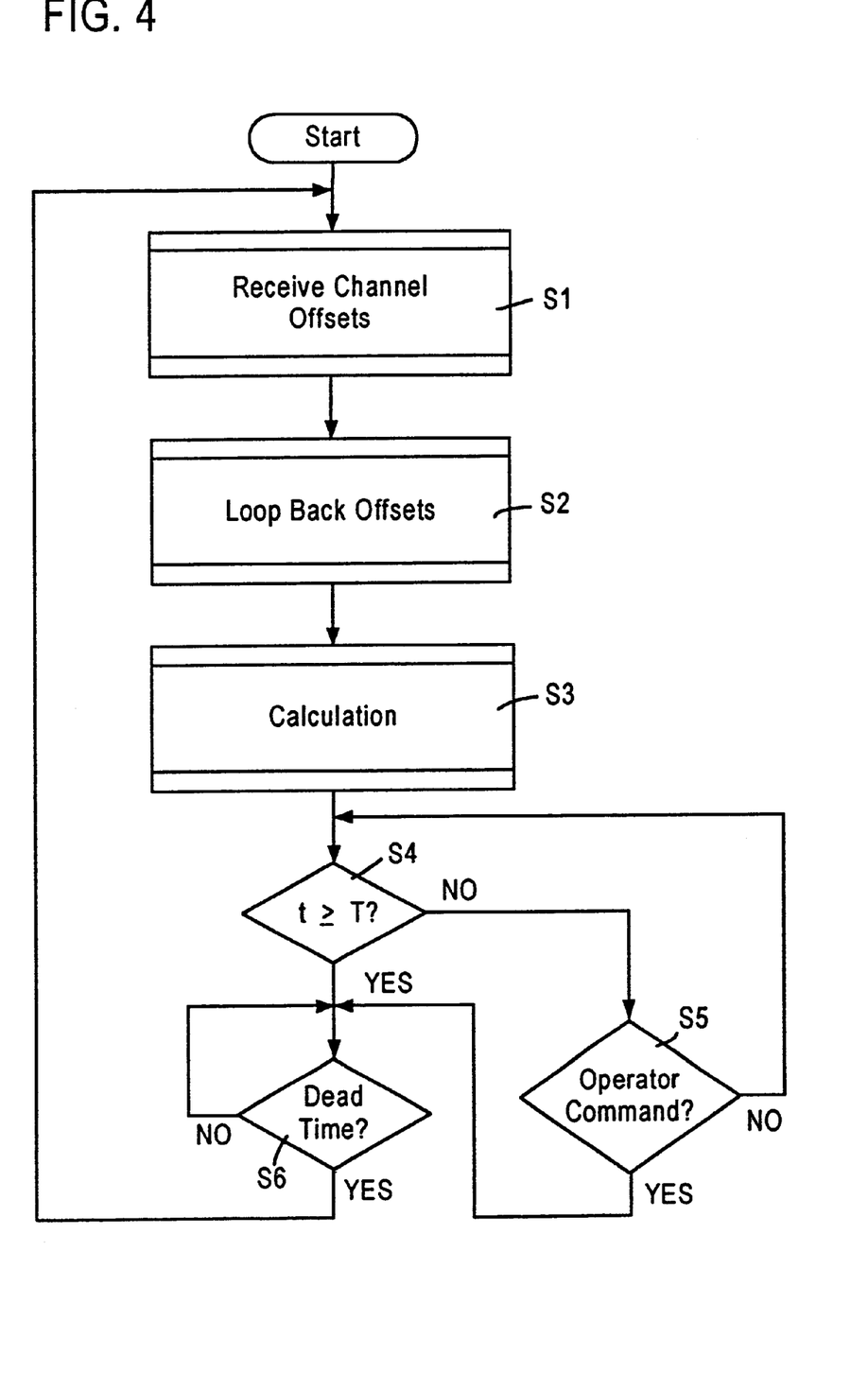
FIG. 4 illustrates an exemplary flow diagram of a method of calibrating offsets in the present invention.

As shown in subroutine step S1 of FIG. 4, the calibration process first obtains the receive channel I/Q data. Next, the loop back operation is performed and the loop back I/Q data is received, as shown in subroutine step S2. Then the received channel I/Q data and the loop back I/Q data is used to compute the receiving unit offsets and the transmission unit offsets, which are then used to calculate the transmission beamforming vectors, as shown in subroutine step S3. As shown in step S4, if a predetermined period of time has elapsed since the previous calibration, the calibration may be performed again, i.e. if $t \geq T$. If the predetermined period of time has not elapsed, the DSP 8 determines whether or not a command from an operator has been received to perform the calibration process, such as during a diagnostics test, as shown in step S5. If an operator command has not been received, then the process loops back to step S4 to determine if the predetermined period of time has elapsed. If the predetermined period of time has elapsed (YES in S4) or an operator command has been received (YES in S5) then the controller 9 determines if the antenna array system is not currently in use, i.e. in a period of dead time. If the antenna array system is currently in use, the routine loops back to S1 and recalibrates the offset parameters (YES in S6). If the antenna array is currently in use, then the routine waits until the antenna array is not in use before recalibrating (NO in S6).

The entire calibration process is an automated process that adjusts the antenna array system to varying conditions. Additionally, the calibration operation does not interfere with the operation of the antenna array in the present embodiment.

Figure 5:
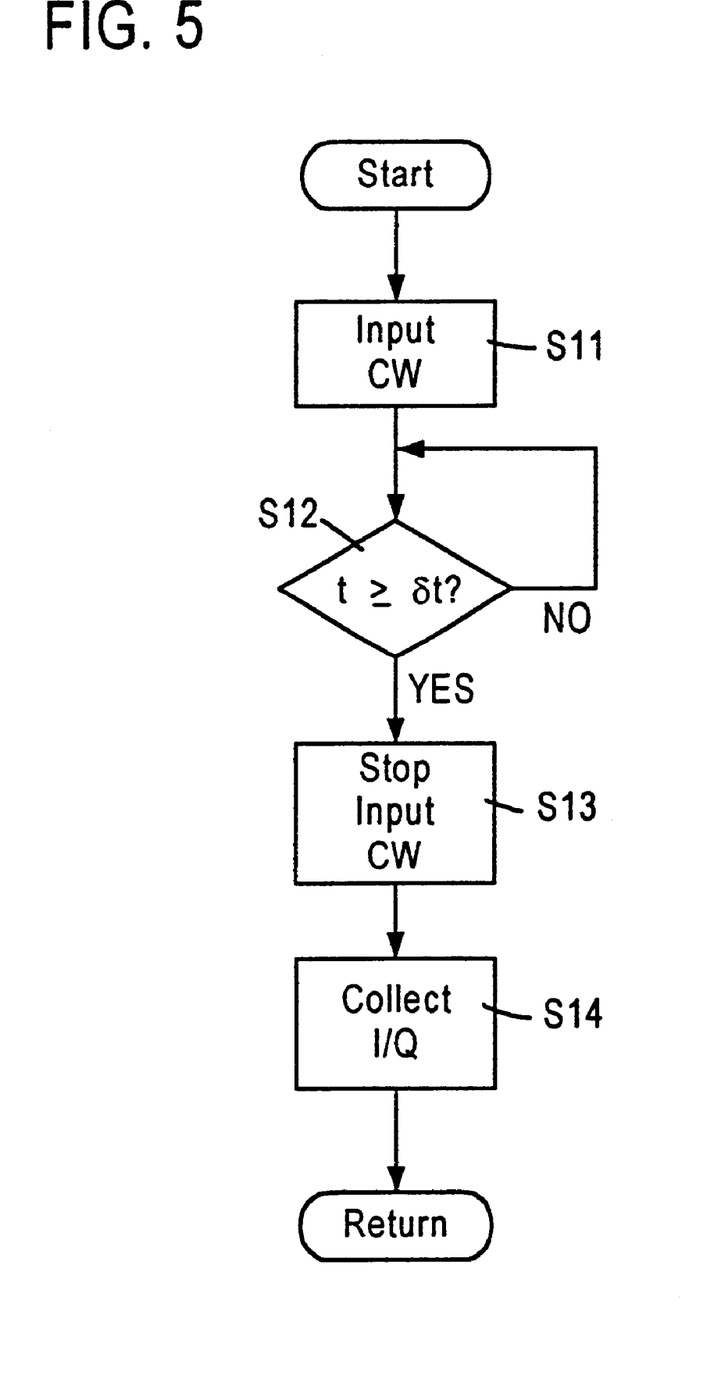
FIG. 5 illustrates an exemplary flow diagram of the determination of the receive channel offsets according to the present invention.

FIG. 5 illustrates the steps of subroutine S1 (FIG. 4) obtaining the I/Q data for the receiving channel calibration. As shown in FIG. 5, the controller 9 provides a command to place switch 10 in the ON position so that the CW signal may be injected in the receiving unit 4 in step S11. The controller 9 determines if a predetermined time period has elapsed, i.e. if $t \geq \delta t$, as shown in step S12. If the predetermined time period has elapsed the controller 9 sends a command to switch 10 to stop injecting the CW signal in the receiving unit 4, i.e. to turn switch 10 in the OFF position, as shown in step S13. The controller 9 then collects the receive unit I/Q data, as shown in step S14, saves the receive unit I/Q data into memory 14 and returns to the main flow diagram in FIG. 4. I/Q data is generated as a result of the demodulation in the digital reception data channel portions 62a–m, as known in the art.

Figure 6:
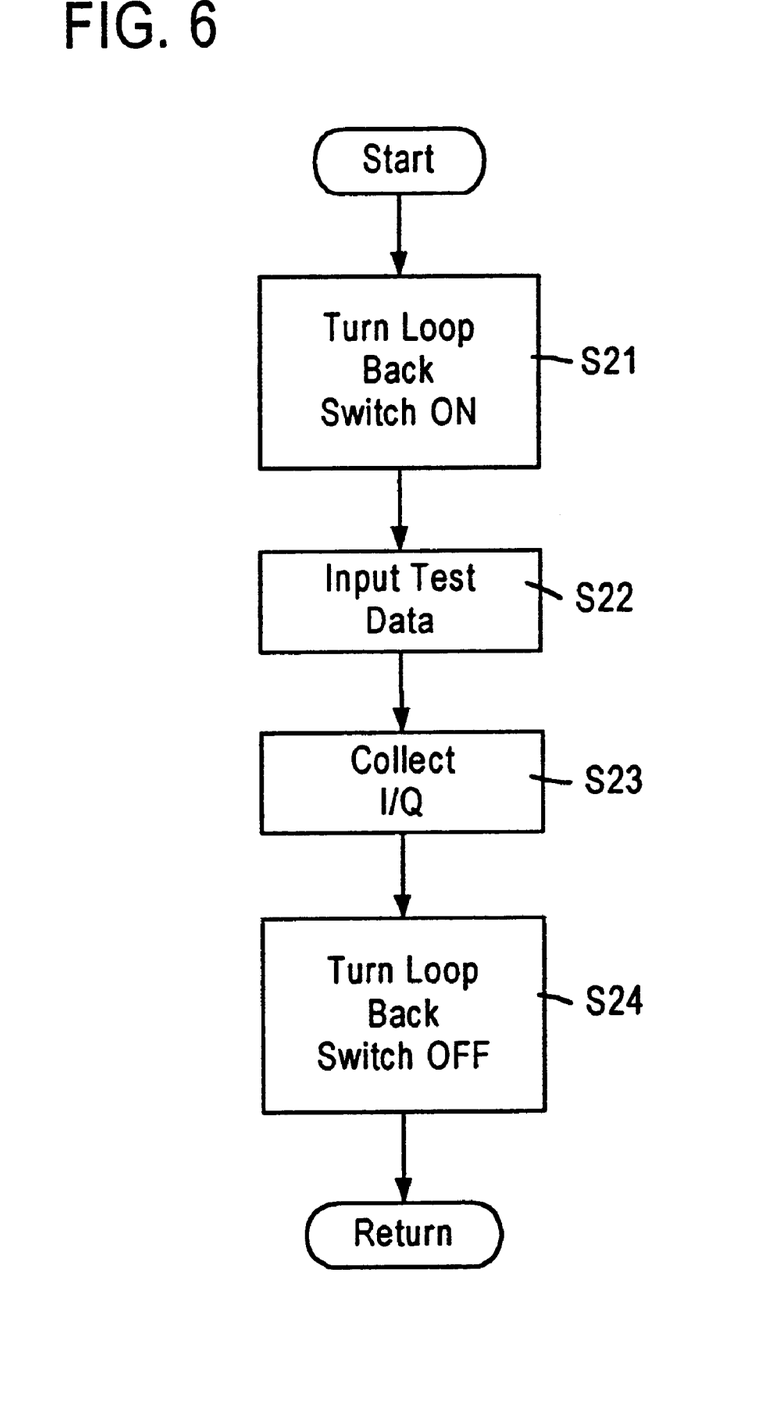
FIG. 6 illustrates an exemplary flow diagram of the determination of the loop back offsets according to the present invention.

FIG. 6 illustrates the steps of subroutine S2 (FIG. 4) obtaining the I/Q data for the loop back operation. As shown in FIG. 6, the controller 9 provides a command to place the loop back switch 11 in the ON position so that the transmission signal becomes the input of the receive unit 4, as shown in step S21. The controller 9 also provides test data which is injected in the transmission data channel unit 5, as shown in step S22. The test data may be injected into each data channel of transmission data channel unit 5 simultaneously. The controller 9 then collects the loop back I/Q data, as shown in step S23 and saves the loop back I/Q data in memory 14. Next, the controller provides a command to place the loop back switch 11 in the OFF position so that the transmission signal is no longer coupled to the input of the receive unit, as shown in step S24.

Figure 7:
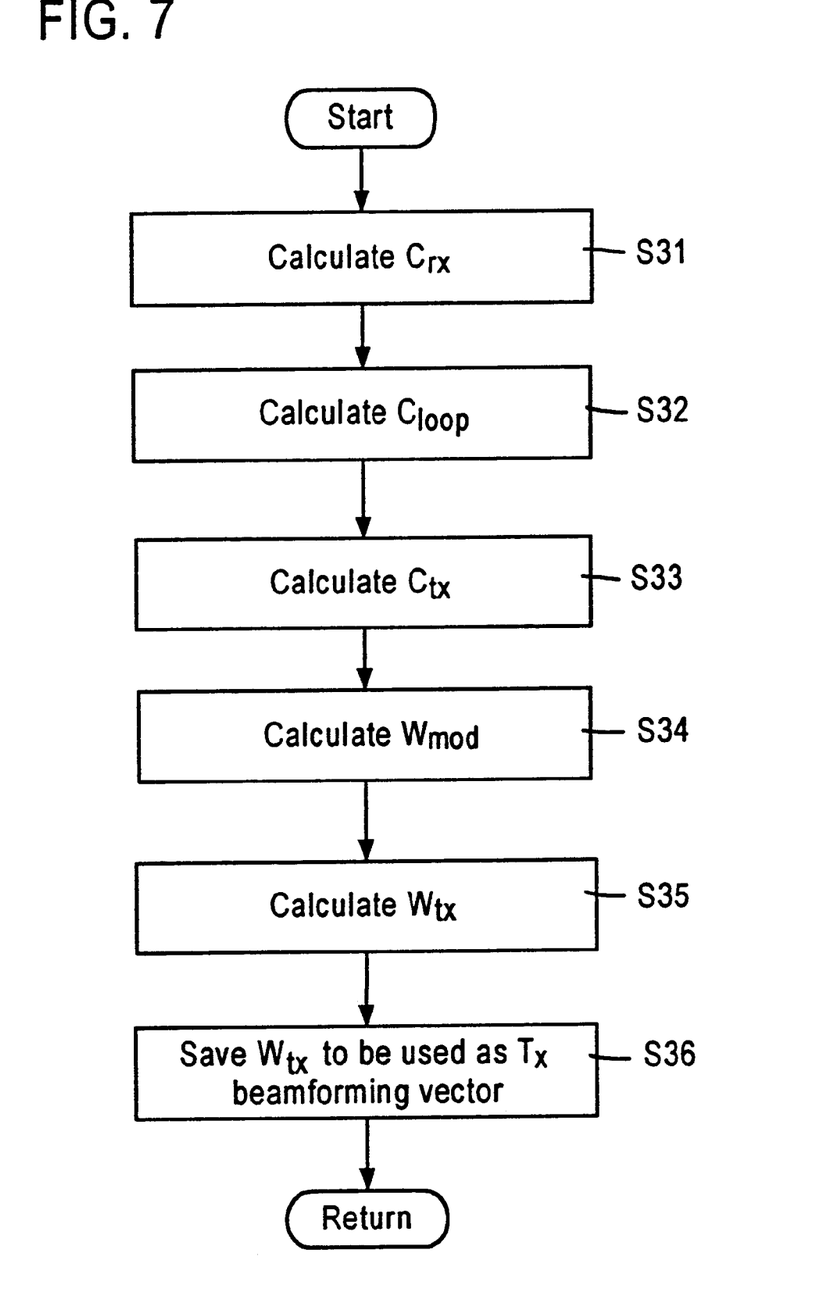
FIG. 7 illustrates an exemplary flow diagram of the determination of the offset and beamforming vector calculations according to the present invention.

As shown in FIG. 7, the subroutine S3 calculates the receive unit offset $C_{rx}$, as shown in step S31, from the receive unit I/Q data stored in memory 14. More particularly, the DSP 8 receives the demodulated digital signal and determines the offsets based on the amplitude and quadrature of the received I/Q signal. The receive unit offset $C_{rx}$, is calculated by performing a curve fit of the receive channel unit I/Q data. The curve fit is preferably achieved in two steps. The magnitude of the collected signal, $sqrt(1^2+Q^2)$, has a constant value for each channel; therefore a constant (real) value can be fit to the collected data using any version of the well-known least-squares technique. The phase of the collected signal, arctangent (Q/I), is a linearly changing function of time since the offset frequency is a constant. Therefore, a straight (real) line can be fit to the collected phase values, by using the least-squares technique, and the y-intercept of the line indicates the offset phase of each channel while the slope of the straight line is the offset frequency. By putting the offset amplitude and the phase together in the form of (ampl)*exp(j*phase), the complex version of the offset coefficient $C_{rx}$ is computed for each channel.

Next, the loop back offset $C_{loop}$ is also calculated by a curve fit of the loop back I/Q data, which is substantially the same as the curve fit calculation of $C_{rx}$ as described above, as shown in step S32. The transmission channel offsets $C_{tx}$ are then calculated in step S33 by dividing the loop back offset by the receive channel offsets, i.e. $C_{tx}=C_{loop}/C_{rx}$, which is a component-wise division for vectors. In step S34 a modification vector $\underline{W}_{mod}$ is calculated by dividing the conjugate of the loop back offset (vector) $C_{loop}$ by the absolute value of the transmission channel offset (vector) $C_{tx}$ squared, i.e. $\underline{W}_{mod}=conj(C_{loop})/abs(C_{tx})^2$. In step S35, the transmission beamforming vector $\underline{W}_{tx}$ is calculated by multiplying the modification vector $\underline{W}_{mod}$ by a previously calculated receive channel beamforming vector $\underline{W}_{rx}$, which has been calculated adaptively from a unique signature of each user, i.e. $\underline{W}_{tx}=\underline{W}_{mod}*\underline{W}_{rx}$. $\underline{W}_{rx}$ can be calculated by an adaptive beamforming technique, which computes complex numbers to be multiplied to the multi-channel signals received from each remote location of the network so that the combined signal duplicates the transmitted signature as closely as possible. These vectors are used directly to extract signals from each remote location by enhancing the signal of interest and by suppressing the signals from all other remote locations. As shown in step S36, $\underline{W}_{tx}$ is saved and is used as the transmission channel beamforming vector is until another calibration operation is performed.

Figure 8:
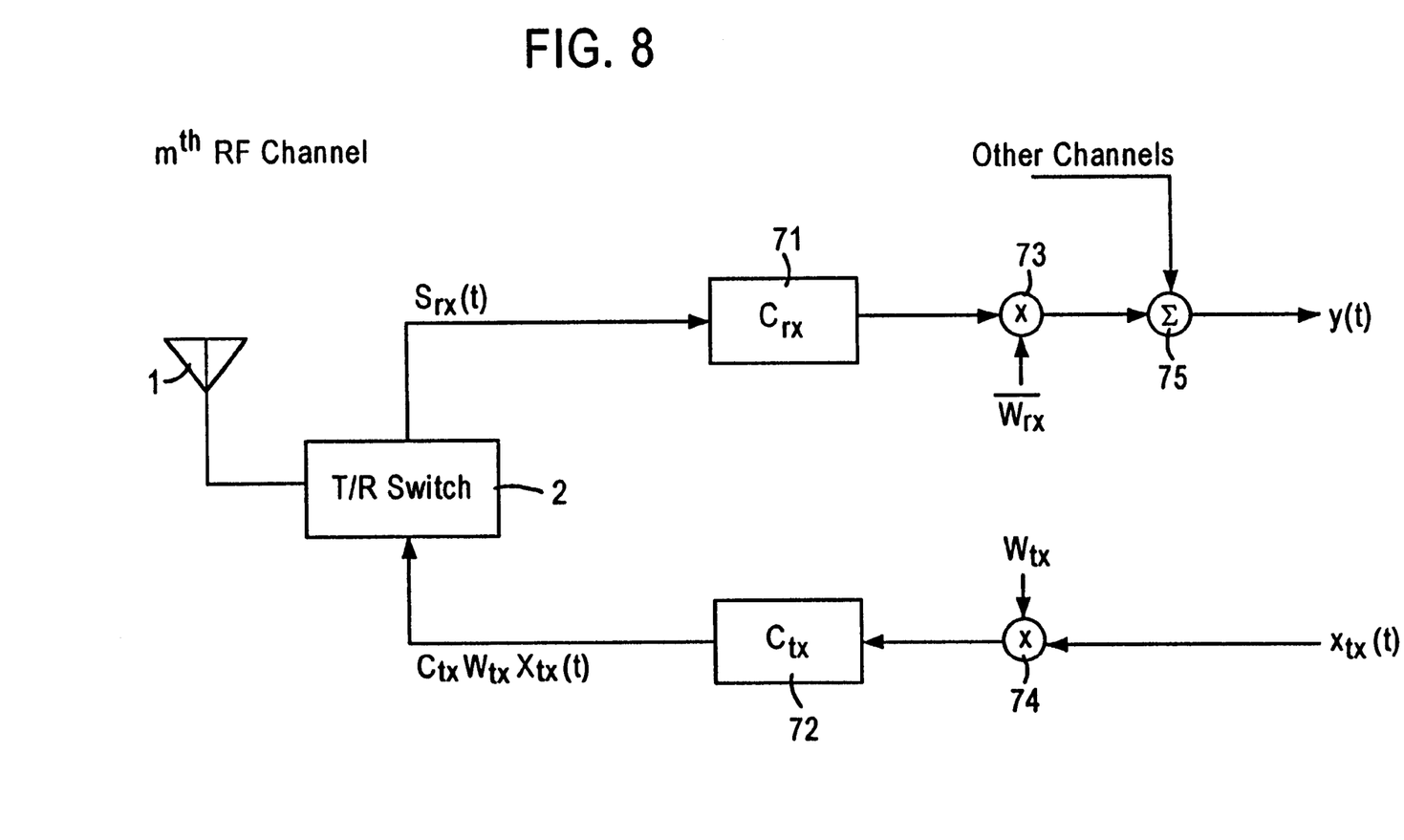
FIG. 8 illustrates an exemplary mathematical representation of using the calibrated parameters of the transmission channel according to the present invention.

FIG. 8 is a mathematical illustration of the present invention for the mth channel. As shown in FIG. 8, after antenna array 1 provides a received signal $S_{rx}(t)$ through T/R switch 2, the receive signal $S_{rx}(t)$ is scaled by a channel offset $C_{rx}$ at offset scaler 71, which compensates for the various offsets which may be introduced. Then the received signal $C_{rx}S_{rx}(t)$ is multiplied by the conjugate of a channel weight $\underline{W}_{rx}$ at multiplier 73. Finally, the received channel signal $C_{rx}S_{rx}(t)\underline{W}_{rx}$ is added with other received channels at sumer 75 and provided as an output y(t). Those of skill in the art will appreciate that $C_{rx}$, $S_{rx}(t)$, and $\underline{W}_{rx}$ are all complex quantities.

As also shown in FIG. 8, the mth transmission channel signal $X_{tx}(t)$ is multiplied by the mth channel weight $\underline{W}_{tx}$ at a multiplier 74, then the product is scaled with the mth channel offset $C_{tx}$ as offset scaler 72. The transmission signal $C_{tx}\underline{W}_{tx}X_{tx}(t)$ is then provided to the antenna array 1 via the T/R switch 2. Those of skill in the art will appreciate that $C_{tx}$, $\underline{W}_{tx}$ and $X_{tx}(t)$ are all complex quantities.

The present invention may be used to automatically calibrate beamforming coefficient for wireless communication networks that employ a multiple number of antenna and RF units to perform spatial diversity. By putting all the control in the digital processing portion of the indoor unit the technique is implemented inexpensively and yet the flexibility of operation is maintained. The automated function also provides an excellent fault location capability. This may be accomplished by examining the amplitude and phase variation among the channels; e.g. a channel with a small amplitude would indicate a problem somewhere in that channel. Also during the process of phase fitting, the closeness of the fit indicates a healthy channel in carrying the phase information, and a poor fit would signal a problem area.

The present invention has several advantages over the prior art. These advantages include, but are not limited to: being able to adaptively calculate the transmission beamforming vector by using the receive beamforming vector; calculating the beamforming vector by using internally generated calibration signals, thus eliminating the need to rely on external devices; adaptively calculating offsets without interfering with the operation of the antenna array; inexpensively achieving an offset calibration and transmission beamforming calculation process; and achieving an offset calibration and transmission beamforming calculation process in an indoor unit, thus reducing the cost and increasing durability of the system.

Although the present invention has been fully described by way of examples with reference to the accompanying drawings, it is to be noted that various changes and modifications will be apparent to those skilled in the art. Therefore, unless such changes and/or modifications depart from the scope of the present invention as defined by the appended claims, they should be construed as being included therein.

I claim:

1. An antenna array calibration apparatus comprising:
    a calibration signal generating unit which generates a calibration signal from a coherent source;
    a calibration signal injecting unit which is operable to selectively inject said calibration signal as an input signal;
    a receiver unit which receives said input signal and obtains a channel signal from said input signal;
    a reception data channel unit which receives said channel signal and generates a first set of I/Q signals; and
    a controller which controls said calibration signal injecting unit to selectively insert said calibration signal as said input signal, and receives said first set of I/Q signals from said reception data channel unit, wherein said controller calculates a reception data channel offset based on said first set of I/Q signals.

2. The antenna array calibration apparatus of claim 1, wherein said first set of I/Q signals comprises a plurality of I/Q signals, and said controller calculates said reception data channel offset by determining a curve fit of said plurality of I/Q signals.

3. The antenna array calibration apparatus of claim 1, further comprising:
    a transmission data channel unit which includes a transmission data channel, said transmission data channel being provided with a test signal;
    a transmission unit which generates a transmission signal based on said transmission data channel;
    a loop back unit which selectively provides said transmission signal as said input signal, wherein
    said controller controls said loop back unit to selectively provide said transmission signal as said input signal,
    said reception data channel unit generates a second set of I/Q signals based on said transmission signal provided as said input signal, and provides said second set of I/Q signals to said controller, and
    said controller calculates a loop back offset based on said second set of I/Q signals.

4. The antenna array calibration apparatus of claim 3, wherein said controller calculates transmission channel offset according to the equation:

$$C_{tx}=C_{loop}/C_{rx},$$

where:
    $C_{tx}$ represents the transmission data channel offset,
    $C_{loop}$ represent the loop back offset, and
    $C_{rx}$ represents the reception data channel offset.

5. The antenna array calibration apparatus of claim 4, wherein said controller calculates a modification vector according to the equation:

$$\underline{W}_{mod}=\text{conj}(C_{loop})/\text{abs}(C_{tx})^2$$

where:
    $\underline{W}_{mod}$ represents said modification vector.

6. The antenna array calibration apparatus of claim 5, wherein said controller calculates a transmission beamforming vector according to the equation:

$$\underline{W}_{tx}=\underline{W}_{mod}*\underline{W}_{rx}$$

where:
    $\underline{W}_{tx}$ represents said transmission beamforming vector, and
    $\underline{W}_{rx}$ represents a reception beamforming vector.

7. The antenna array calibration apparatus of claim 3, wherein said transmission unit comprises a plurality of transmission data channels, and each channel of said plurality of transmission data channels is simultaneously selectively injected with a test signal when said loop back unit selectively provides said transmission signal as said input signal.

8. A method of calibrating an antenna array comprising the steps of:
    generating a calibration signal from a coherent source as an input signal;
    selectively injecting said input signal into a receive channel;
    obtaining a first set of I/Q signals; and
    calculating a reception data channel offset based on said first set of I/Q signals.

9. The method of calibrating an antenna array of claim 8, wherein said set of I/Q signals comprises a plurality of I/Q signals, and said step of calculating a reception data channel offset calculates said reception data channel offset by determining a curve fit of said plurality of I/Q signals.

10. The method of calibrating an antenna array of claim 8, further comprising the steps of:

providing a test signal in a transmission data channel;

generating a transmission signal from said transmission data channel;

selectively providing said transmission signal as said input signal when said calibration signal is not provided as said input signal;

generating a second set of I/Q signals based on said transmission signal provided as said input signal; and calculating a loop back offset based on said second set of I/Q signals.

11. The method of calibrating an antenna array of claim 10, further comprising the step of calculating transmission data channel offset is calculated according to the equation:

$$C_{tx} = C_{loop}/C_{rx},$$

where:

$C_{tx}$ represents the transmission channel offset, $C_{loop}$ represent the loop back offset, and $C_{rx}$ represents the reception channel offset.

12. The method of calibrating an antenna array of claim 11, further comprising the step of calculating a modification vector according to the equation:

$$\underline{W}_{mod} = \text{conj}(C_{loop})/\text{abs}(C_{tx})^2$$

where:

$\underline{W}_{mod}$ represents said modification vector.

13. The method of calibrating an antenna array of claim 12, further comprising the step of calculating a transmission beamforming vector according to the equation:

$$\underline{W}_{tx} = \underline{W}_{mod} * \underline{W}_{rx}$$

where:

$\underline{W}_{tx}$ represents said transmission beamforming vector, and $\underline{W}_{rx}$ represents a reception beamforming vector.

14. The method of calibrating an antenna array of claim 10, wherein said transmission data channel comprises a plurality of transmission data channels, the method further comprising the step of simultaneously injecting each channel of said plurality of transmission data channels with a test signal when said transmission signal is selectively provided as said input signal.

15. An antenna array apparatus comprising:

an antenna array which transmits and receives signals;

a receiving unit which obtains reception data channels from received signals;

a transmission unit which generates a transmission signal from transmission data channels;

a calibration signal generating unit which generates a calibration signal from a coherent source;

a calibration signal injecting unit which is operable to selectively inject said calibration signal as an input signal into said receiving unit;

a reception data channel unit which receives said reception data channels from said receiving unit and generates a first set of I/Q signals; and a controller which controls said calibration signal injecting unit to selectively insert said calibration signal as said input signal, and receives said first set of I/Q signals from said reception channel unit, wherein said controller calculates a reception data channel offset based on said first set of I/Q signals.

16. The antenna array apparatus of claim 15, wherein said set of I/Q signals comprises a plurality of I/Q signals, and said controller calculates said reception data channel offset by determining a curve fit of said plurality of I/Q signals.

17. The antenna array calibration apparatus of claim 16, further comprising:

a transmission data channel unit which includes a transmission data channel, said transmission data channel being provided with a test signal; and a loop back unit which selectively provides said transmission signal as said input signal, wherein said controller controls said loop back unit to selectively provide said transmission signal as said input signal, said reception data channel unit generates a second set of I/Q signals based on said transmission signal provided as said input signal, and provides said second set of I/Q signals to said controller, and said controller calculates a loop back offset based on said second set of I/Q signals.

* * * * *